United States Patent
Uddenberg et al.

(10) Patent No.: US 7,805,554 B2
(45) Date of Patent: Sep. 28, 2010

(54) METHODS AND STRUCTURES FOR TESTING SAS TRANSCEIVER TRAINING OPTIONS IN SAS-2 TRAINING WINDOWS

(75) Inventors: David T. Uddenberg, Colorado Springs, CO (US); Gabriel L. Romero, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 294 days.

(21) Appl. No.: 11/691,195

(22) Filed: Mar. 26, 2007

(65) Prior Publication Data

US 2008/0244100 A1    Oct. 2, 2008

(51) Int. Cl.
G06F 13/12 (2006.01)
G06F 13/00 (2006.01)
G06F 15/173 (2006.01)
G06F 1/24 (2006.01)

(52) U.S. Cl. .................. 710/74; 711/100; 709/223; 713/100

(58) Field of Classification Search .................. 710/74; 711/100; 709/223; 713/100
See application file for complete search history.

(56) References Cited

U.S. PATENT DOCUMENTS 7,373,443 B2 * 5/2008 Seto ........................... 710/100
7,377,800 B2 * 5/2008 Gasser ........................ 439/374

* cited by examiner

Primary Examiner—Henry W Tsai
Assistant Examiner—Juanito C Borromeo
(74) Attorney, Agent, or Firm—Duft Bornsen & Fishman LLP (57) ABSTRACT

Method and structures provide for testing a SAS link in association with participating in training windows to determine success/failure in using a negotiated speed using one or more configured sets of transceiver training options. For each device linked to a master SAS device, each possible set of transceiver training options is configured and one or more SCSI requests are forwarded from the master device to the attached device. The SCSI requests may be non-destructive of data stored on the attached device. Results of the tests may be used to select a preferred set of transceiver training options for communication between the master device and that attached device. The transceiver training options to be varied and tested may include: amplitude, slew rate, de-emphasis, and spread spectrum clocking.

18 Claims, 5 Drawing Sheets

METHODS AND STRUCTURES FOR TESTING SAS TRANSCEIVER TRAINING OPTIONS IN SAS-2 TRAINING WINDOWS

RELATED APPLICATIONS

The patent application is related to co-pending, commonly owned patent application Ser. No. 11/691,240 filed on the same day and entitled METHODS AND STRUCTURES FOR TESTING SAS-2 SPEED OPTIONS IN SPEED NEGOTIATION WINDOWS which is hereby incorporated by reference.

FIELD OF THE INVENTION

The invention relates to serial attached SCSI ("SAS") communications and more specifically relates to improvements in use of SAS-2 training windows to test various configurations of link options for exchanges between two devices at various supported SAS speeds.

BACKGROUND

In SAS communications one or more SAS initiator devices may be coupled to one or more SAS target devices through zero or more SAS expanders to form a SAS domain. In general, SAS initiator devices may initiate or request an initial connection to a particular identified SAS target device. Prior to initiating or requesting such a connection, devices within the SAS domain must perform initial processing to establish one or more mutually supported speeds for communication between any pair of connected devices. In general, each SAS device (initiator, target, or expander) may support one or more SAS speeds for communication with other SAS devices coupled to its PHYs. SAS specifications provide for a variety of SAS speeds standardized for communications between SAS devices. Some devices may support only one or a few lower speeds, other devices may support only one or a few higher speeds, and many devices support a broad spectrum of high and/or low SAS speeds.

The process of establishing the mutually supported speeds that may be used for communication between any two devices is referred to as speed negotiation. For example, in the currently evolving SAS-2 specifications, each device must support a speed negotiation window. The speed negotiation process in the specification defines signals exchanged between a pair of SAS devices to determine one or more SAS speeds supported by both devices in a particular desired link. If multiple speeds are supported by both devices, the highest supported speed is generally utilized if performance is critical while a slower speed may be utilized if reliability is more important than communication speed. Even under the earlier SAS-1 specifications, each pair of devices performs a negotiation process to identify mutually supported SAS speeds for exchanges between the pair.

The speed negotiation process, whether in compliance with evolving SAS-2 standards or in compliance with earlier SAS standards, identifies one or more mutually supported SAS speeds for a pair of linked SAS devices and may also identify a set of speed related options for the one or more SAS speeds. Following establishment of one or more mutually supported SAS speeds, the SAS-2 specifications provide for a training window during which the pair of devices exchange predefined signals to test the link at a selected, mutually supported SAS speed and at a presently selected set of speed options. As presently specified in the evolving SAS-2 specifications, processing of the devices during the training window exchanges signals between a pair of SAS devices to verify that the devices can communicate using a selected speed with selected speed related options. In addition to a variety of SAS speeds and associated speed related options, the evolving SAS-2 specifications specify a number of training options for SAS transceivers that may be modified for improved communication between linked devices. These training options include, for example, amplitude of transmission, slew rate, de-emphasis, and spread spectrum clocking ("SSC"). The SAS-2 specifications and other related background material generally known to those of ordinary skill in the art is readily available at www.t10.org and other public locations and sites.

Interoperability of SAS devices from various vendors is an ongoing challenge. In particular, in view of the various training options that may be specified and/or modified for each device, the challenge of interoperability is further exacerbated. As presently specified in the evolving SAS-2 specifications, there is little assurance that a particular SAS speed and associated speed options, though mutually supported by both devices, will provide reliable exchanges between the pair of devices. One vendor may utilize particular default training related option settings while another vendor may prefer other default settings for their transceiver operation— even at the same mutually supported SAS speed. Nothing in the present evolving version of the SAS-2 specifications provides for relief from this interoperability challenge.

It is evident from the above discussion that an ongoing need exists to improve reliability of transfers between a pair of SAS devices by assuring that a mutually supported SAS connection will provide a desired level of both performance and reliability.

SUMMARY

The present invention solves the above and other problems, thereby advancing the state of the useful arts, by providing methods and associated structure to test all training option settings for the transceiver for each device in a pair of communicating SAS devices. Features and aspects hereof provide for such testing in conjunction with the training window processing between a pair of coupled SAS devices. Testing of each set of transceiver training options may include the exchange of SCSI requests and responses between the pair of SAS devices. Results of the testing may then be utilized by automated or manual administrative procedures to select a set of preferred transceiver training options for communication between the pair of SAS devices.

DETAILED DESCRIPTION OF THE DRAWINGS

Figure 1:
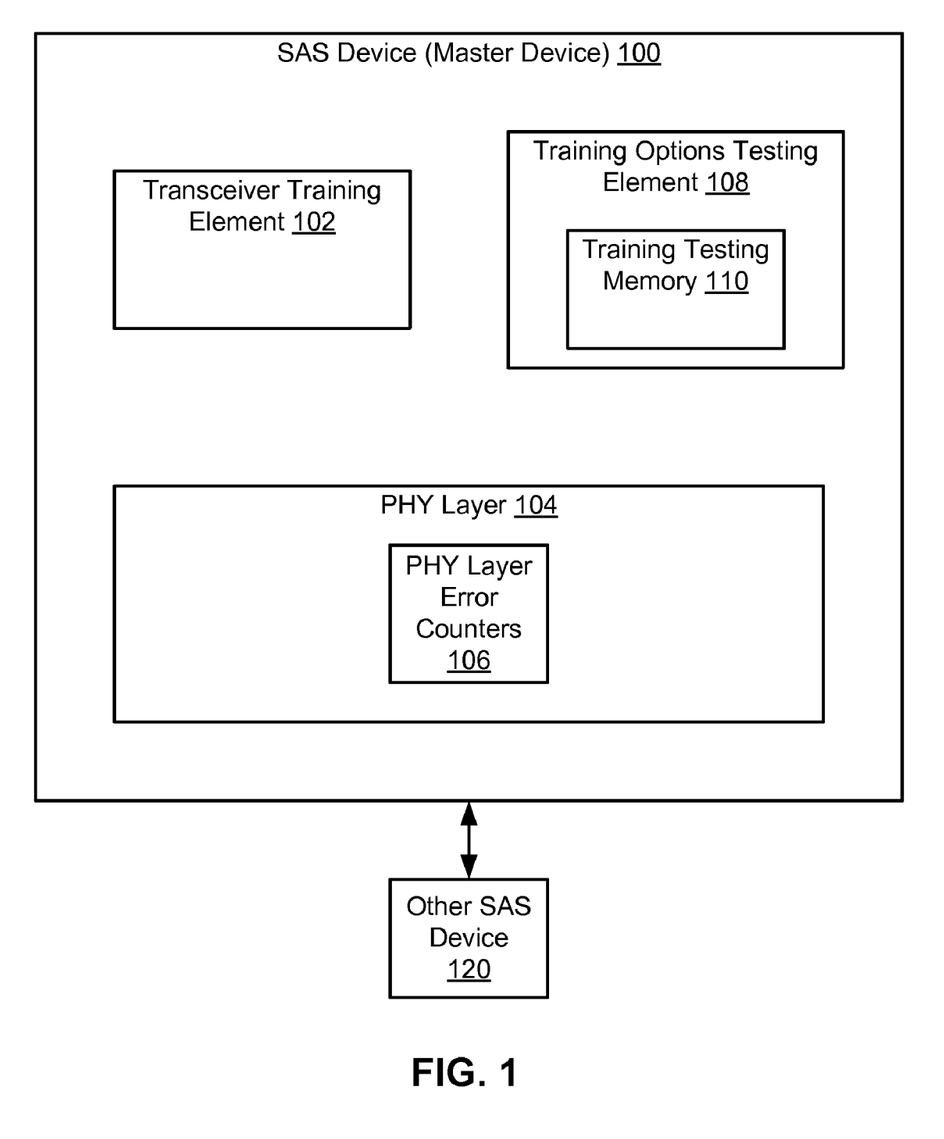
FIG. 1 is a block diagram of a SAS device enhanced in accordance with features and aspects hereof to test various configured sets of transceiver training options for a supported SAS speed.

FIG. 1 is a block diagram of an exemplary SAS device 100 enhanced in accordance with features and aspects hereof to perform testing of transceiver options during training window processing. The SAS device 100 may also be referred to herein as a "master" device in that, as regards the training window processing, device 100 is the device controlling and performing the training processing to determine which of its supported transceiver options are best suited for communications with the attached SAS device.

SAS device 100 may include a transceiver training element 102 for performing training of the transceiver during a training window in accordance with SAS-2 specifications and in accordance with features and aspects hereof. SAS transceiver training element 102 is coupled to and co-operable with PHY layer 104. PHY layer 104 performs standard state machine processing as specified in the SAS specifications to control physical layer operation of the communication media coupling device 100 to other SAS device 120. PHY layer 104 may include error counters 106 for counting the number of detected errors in the PHY layer communication processing. As will be discussed further herein below, the error counters may be used in accordance with features and aspects hereof to determine the success or failure of a particular set of transceiver options for use between the master device 100 and the other SAS device 120.

Training element 102 within SAS device 100 may be associated with training options testing element 108 adapted to test various sets of transceiver options supported by master device 100. The training testing memory 110 may be used for storing information regarding various possible combinations of transceiver option settings and may be used for recording associated test results for each tested combination of transceiver options tested by training options testing element 108 in conjunction with operation of element 102 on behalf of master device 100.

In operation, SAS device 100, when initialized such as at start of day or power on reset processing and following speed negotiations to establish a mutually supported SAS speed, participates in a training window to test operation of the transceiver with the attached other SAS device 120. Training processing is generally specified by the SAS-2 specifications to be performed under a protocol defined for processing during a training window. As specified therein and as well known to those of ordinary skill in the art, SAS device 100 instructs its PHY layer 104 to exchange various standardized signals with other SAS device 120 to test transmission and reception by the transceiver of the master device 100.

In accordance with features and aspects hereof, the transceiver may be configurable with respect to any of several options. Thus, though the two devices may have established a mutually supported SAS speed, the transceiver of the master device 100 may be re-configured as regards these various options to improve the performance and/or reliability of exchanges between the two devices. Training element 102 and training options testing element 108 may therefore cooperate to test each of one or more possible combinations of the various configurable options of the transceiver of the master device 100. A list of the various sets of transceiver training option configurations and associated test results may be constructed and maintained in training testing memory 110. Those of ordinary skill in the art will readily recognize that every possible set of transceiver options may be configured and tested or some lesser subset of the possible combinations of options may be tested. The lesser subset of possible speed options may be determined as appropriate for the particular application of the SAS device 100. For example, certain application environments known to require higher reliability and/or known to be particularly noisy environments may avoid utilizing certain higher performance configurations in favor of higher reliability transceiver option settings. Or, for example, portable applications having limited power may utilize only option settings that help conserve scarce power resources. The particular sets of transceiver options to be tested may be selected as a matter of design choice well known to those of ordinary skill in the art.

As noted above and as discussed further herein below, transceiver options testing element 108 may be operable to test each combination of transceiver options by transmitting suitable SCSI requests from the master device 100 to the other SAS device 120. The request and corresponding response may be exchanged with each configured set of options. The SCSI request is communicated from SAS device 100 to other SAS device 120. The response generated therefrom is evaluated by SAS device 100 to determine the success or failure of the particular configured set of transceiver options.

Operation of transceiver options testing element 108 may utilize training testing memory 110 to construct a list of the sets of tested transceiver options. The resulting list indicates transceiver option settings and verified by testing element 108. The resulting list of tested, verified transceiver options settings may be communicated to an administrative process or user to select a setting for the particular application of SAS device 100. Further, the list of tested and supported transceiver option configurations may also be utilized by an automated process or agent within SAS device 100 to automatically select among the options. The selection of a supported/tested option setting may therefore be performed by any suitable manual or automated means as a matter of design choice.

Those of ordinary skill in the art will readily recognize that the particular functional/modular decomposition of functional and physical elements within SAS device 100 is intended merely as exemplary of one possible embodiment of features and aspects hereof. Numerous alternative and equivalent functional and modular decompositions will be readily apparent to those of ordinary skill in the art as a matter of design choice. In particular, the integration or separation of training element 102 and/or testing element 108 relative to PHY layer 104 may be determined as a matter of design choice in a particular embodiment of features and aspects hereof.

Figure 2:
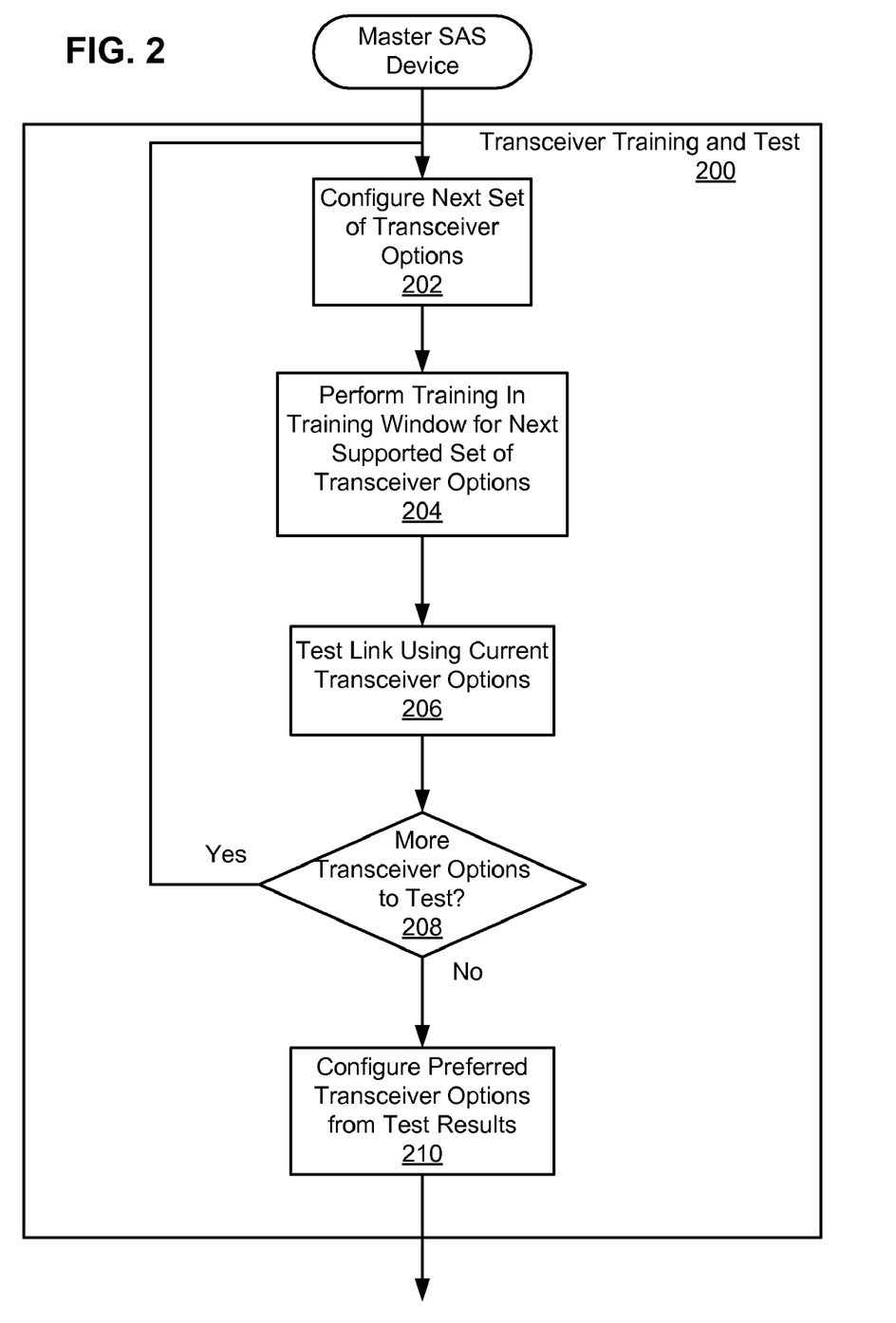
FIGS. 2-5 are flowcharts of methods in accordance with features and aspects hereof to test various configured sets of transceiver training options for a supported SAS speed.

FIG. 2 is a flowchart describing a method in accordance with features and aspects hereof for improved training within a master SAS device. In accordance with features and aspects hereof, the master device performs training and test processing 200. Standard training processing of element 200 is generally in accordance with the SAS-2 specifications while test processing of element 200 is in accordance with enhanced features and aspects hereof. As is known to those of ordinary skill in the art, the SAS-2 specifications call for transceiver training to be performed in a training window defined as an aspect of the SAS protocol. In standard training, signals are exchanged between the master SAS device and an attached SAS device during the training window to verify operation of the link. In accordance with features and aspects hereof the training and test element 200 is enhanced to include testing of each of one or more possible combinations of transceiver training options. Thus, training and test element 200 includes iterative steps to test each of various combinations of transceiver options and to generate a list of test results for each tested set of transceiver options.

Element 202 is first operable to configure a next (or first) set of transceiver options for training and testing to be performed. As noted herein, transceiver options may include such settings as: amplitude, slew rate, de-emphasis, and spread spectrum clocking (SSC) as well as various timing values related to the training and communication processing of the master device. The training timing values that may be configured may include one or more of: rate change delay time ("RCDT"), train-snw time ("TWT"), training lock time ("TLT"), maximum training time ("MTT"), and actual training time ("ATT"). Element 204 then performs SAS-2 standard training for the presently configured set of transceiver options. Next, element 206 performs additional testing of the link as presently configured by exchanging SCSI commands and responses with the other SAS device. Results of the testing may be recorded in a table stored in a memory associated with the master SAS device.

Element 208 then determines whether other sets of transceiver options remain to be configured for training and testing. If so, processing continues looping back to element 202 until all sets of transceiver options are configured, trained, and tested to generate the list of transceiver configurations and associated test results. When all configurations have been tested, the list/table of test results may be used by element 210 to select a preferred set of transceiver options and to configure the master device for those selected, preferred options. Processing of element 210 may represent any suitable manual or automated process to select a preferred transceiver configuration for the particular application of this link of the master SAS device.

Figure 3:
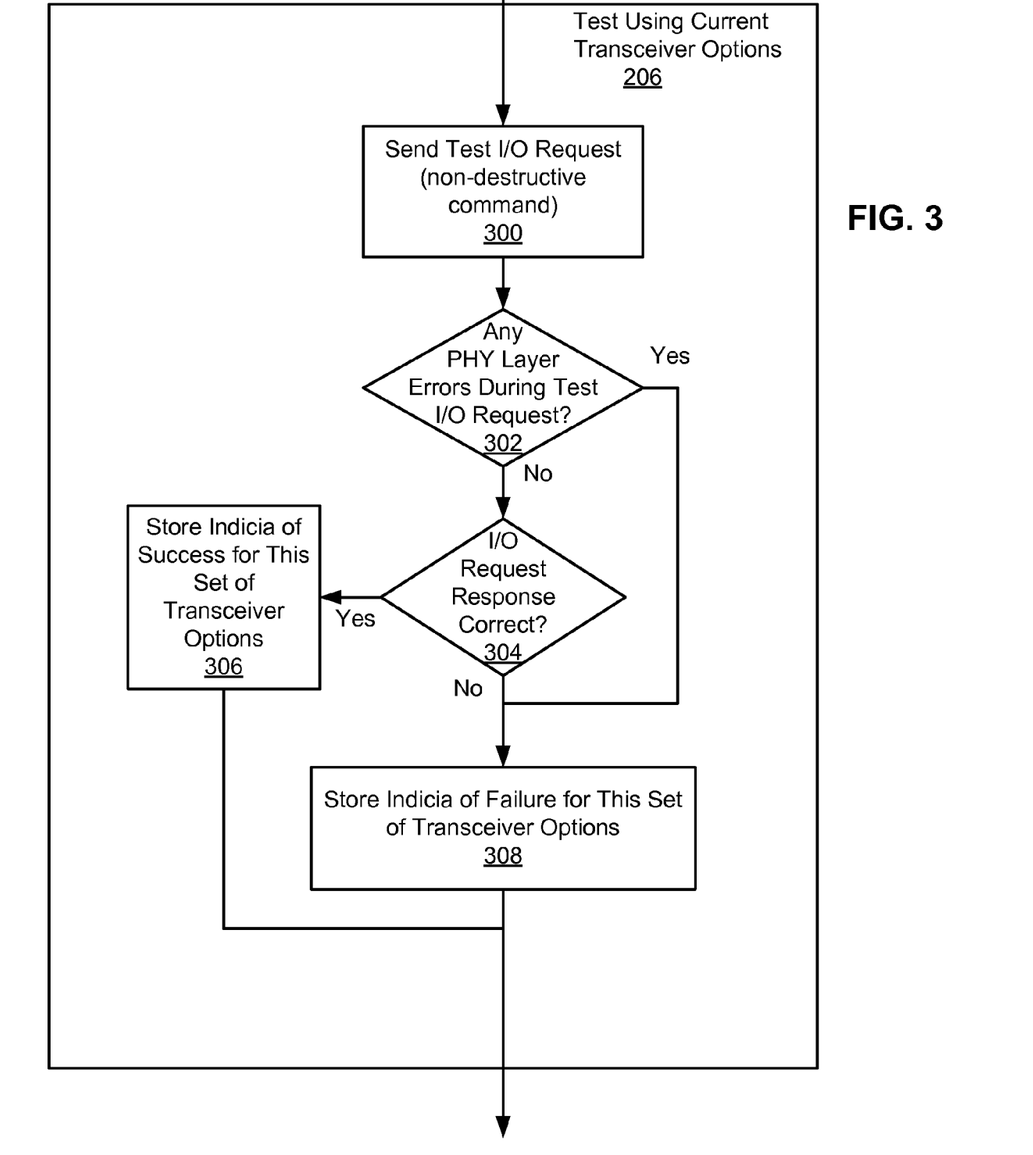

FIG. 3 provides exemplary additional details of the processing of element 206 of FIG. 2 to test the link using presently configured transceiver options. Element 300 is first operable to test the SAS link by generation and transmission of one or more SCSI requests from the master device directed to the other SAS device. Element 300 further comprises receiving and evaluating any response to the SCSI request. Based in part on the particular SCSI request and response received, if any, element 300 may determine success or failure of the SAS link as presently configured between the master SAS device and the other SAS device coupled thereto.

In one exemplary embodiment, the SCSI requests generated and transmitted by operation of element 300 may be non-destructive SCSI requests that will not negatively impact or modify any data stored on the other SAS device. Exemplary of such non-destructive SAS SCSI requests are, test unit ready, inquiry, read buffer, etc. Where the other SAS device is a device that does not risk the loss of stored data, other SCSI requests may be utilized as a matter of design choice without risk of loss of data.

Elements 302 and 304 determine whether any errors occurred during the testing operation of element 300. In addition to determining success or failure of the SCSI request based on the SCSI request and the associated SCSI response, if any, element 302 further may determine success or failure of the test by evaluating how many if any PHY layer errors occurred during the performance of the SCSI exchange. In accordance with features and aspects hereof, counters or other indicia associated with PHY layer processing may identify and/or count the number of PHY layer errors that occurred during the SCSI request/response exchange. Exemplary of such PHY layer errors are 8b10b encoding errors, symbol errors, parity errors, DWORD synchronization errors, etc. Detection of such PHY layer errors is generally known to those of ordinary skill in the art. If no PHY layer errors are detected, element 304 determines whether the SCSI request/response proceeded without other errors.

If no errors are detected from the testing of elements 300 through 304, element 306 is operable to store indicia of success for this presently configured transceiver options. Alternatively, if errors are detected in the processing of elements 300 through 304, element 308 is operable to store indicia of failure for the presently configured set of transceiver options. Following processing of the elements 306 or 308 to store appropriate success/failure indicia, processing of element 206 is complete.

Figure 4:
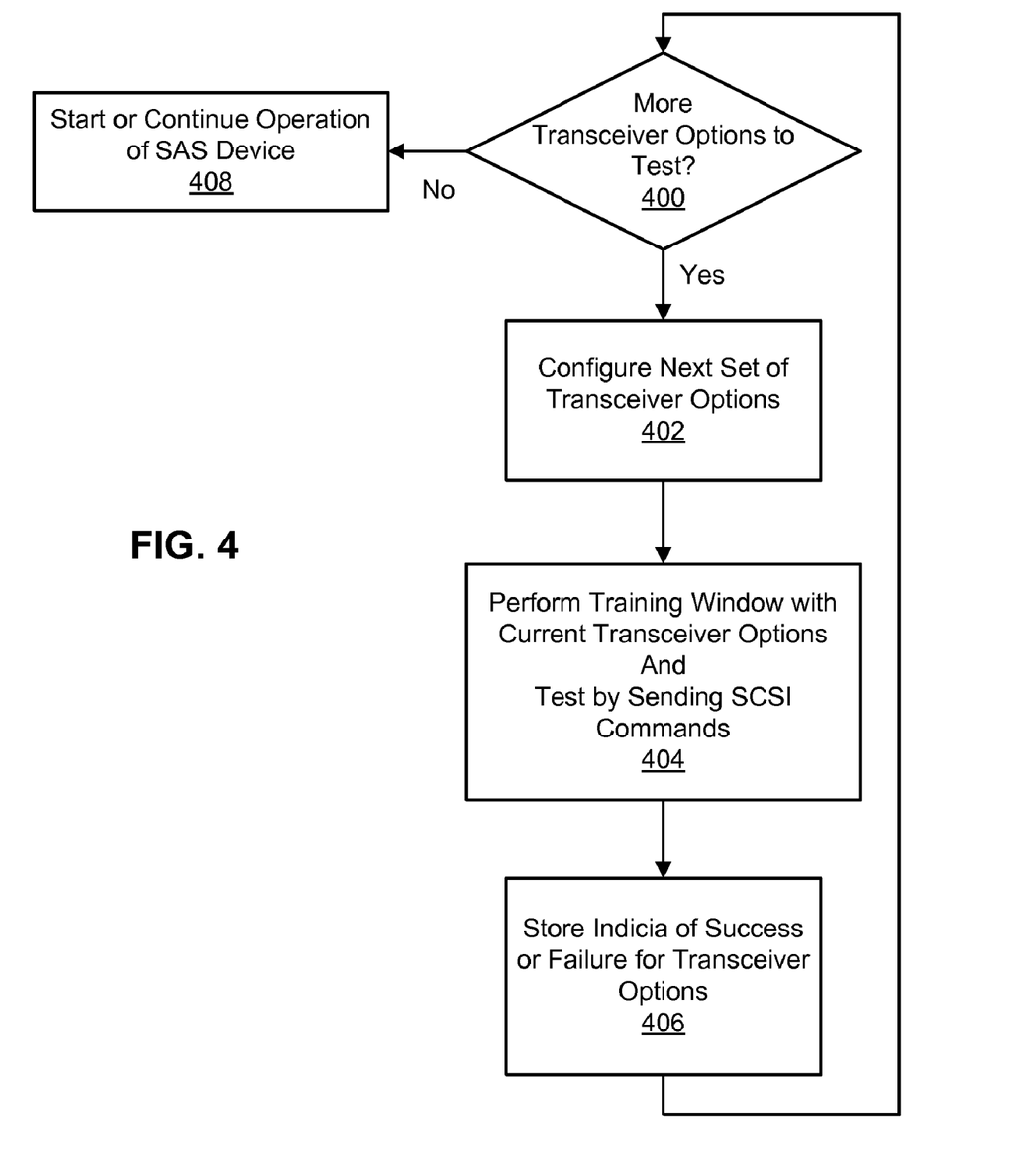

FIG. 4 is a flowchart describing another exemplary method in accordance with features and aspects hereof for testing transceiver options of a SAS link as an aspect of the training window processing between a master SAS device and an associated other SAS device. The method of FIG. 4 generally comprises iteratively testing one or more sets of configured transceiver options for the master SAS device performing the training process. In particular, elements 400 through 406 are performed for each set of transceiver options of the master device. In general, these steps configure a next set of transceiver options to be utilized for participation in a training window between the master SAS device and the other SAS device couple thereto. Next, the repeated steps perform a training process generally in accordance with the SAS-2 specifications but enhanced to include additional testing of currently configured transceiver options to determine success or failure of the configuration. Lastly, the repeated steps include storing indicia of success or failure of the training and testing process for currently configured set of transceiver options. These steps are then repeated for each combination of transceiver options until all combinations of transceiver options have been tested and test results appropriately stored for subsequent utilization.

More specifically, element 400 is operable to determine whether additional transceiver option configurations supported by the master SAS device remain to be trained and tested. If not, element 408 is operable to start or continue normal operation of the SAS device including, for example, selecting one of the tested transceiver configurations for use by the master device. If more option configurations remain to be evaluated, element 402 is operable to configure the next set of transceiver options. Exemplary options may be as exemplified above and as appropriate for the particular application. Element 404 then performs standard SAS training window processing generally in accordance with the SAS-2 specifications. Further, element 404 is operable as enhanced by features and aspects hereof to test the link with the currently configured transceiver options. As noted above, the testing may comprise generating and transmitting SCSI requests from the master device to the other SAS device coupled thereto. In one exemplary embodiment where the other SAS device may store user supplied data, the particular SCSI commands sent for purposes of testing may be non-destructive of such user data. For example, SCSI inquiry, testing unit ready, and read buffer commands may be utilized to test the link between the master device and other SAS device without risk of destroying any user data stored in the other SAS device. Element 404 therefore generates and transmits an appropriate SCSI request and receives the response therefrom.

Based on the SCSI response and potentially other indicia of success or failure of the transmitted request and response, element 406 is then operable to store appropriate indicia of success or failure determined from the testing process for the currently configured set of transceiver options. In general, the stored indicia may be stored in any suitable memory or register structure associated with the master SAS device such that the particular configured set of options are identified along with the results of the testing process for that configured set of options. Such a table or register structure may then be utilized by an administrative user or process to permit manual or automated selection of a preferred or optimal transceiver configuration for the particular application and the particular environment. Following processing of elements 402 through 406, processing continues looping back to element 400 to determine whether additional sets of options need to be configured and tested.

As noted above, determination of success or failure of the testing performed by element 404 may include verifying correct receipt of a SCSI response generated by the other SAS device in response to the SCSI request as well as monitoring of any PHY layer errors occurring during the SCSI exchange. The PHY layer may therefore include suitable indicia or counters to indicate occurrence of particular errors in the SCSI request/response exchange.

Figure 5:
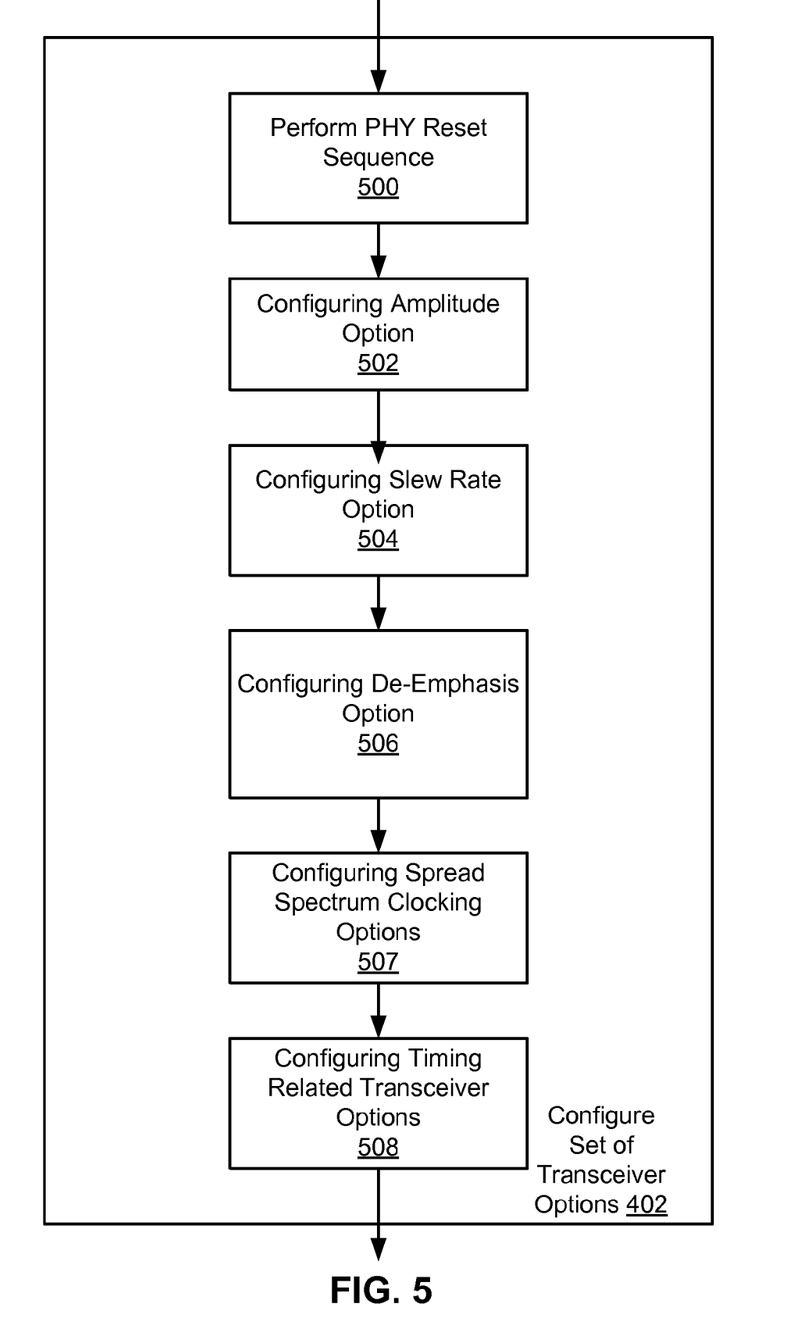

FIG. 5 is a flowchart providing exemplary additional details of the processing of element 402 of FIG. 4 to configure a next set of transceiver options prior to testing the link as presently configured. In advance of the testing of a particular set of options, a PHY reset sequence is performed to initiate the next training window with a newly configured set of transceiver options. By so cycling the status of the link, the other SAS device will be prepared to perform a training process again in response to the master SAS device and to respond to test commands in accordance with features and aspects hereof. Element 500 is thus operable to perform a PHY reset sequence in preparation for a new training and testing process. Elements 502 through 508 are then operable to configure each of the settings for the next set of transceiver options to be tested by operation of the method discussed above with respect to FIG. 4. Specifically, element 502 configures an amplitude option, element 504 configures the slew rate option, element 506 configures the de-emphasis option, element 507 configures the spread spectrum clocking options and element 508 configures other timing related options for the training process as noted above.

Those of ordinary skill in the art will readily recognize numerous additional and equivalent method steps associated with the processing of the methods of FIGS. 2 through 5 above. Such additional and equivalent steps are eliminated here simply for brevity of this discussion. In addition, those of ordinary skill in the art will readily recognize standard processing within a SAS device to utilize a list of mutually supported, tested SAS speeds for purposes of selecting a preferred or optimal SAS speed for the particular link in the particular application.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for serial attached SCSI ("SAS") speed negotiation between a first SAS device and a second SAS device, the method comprising:
configuring the first SAS device and the second SAS device for a first mutually supported speed;
selecting a next set of training options as a current set of training options for the first SAS device and the second SAS device;
performing training between the first SAS device and the second SAS device during a corresponding training window;
exchanging information between the first SAS device and the second SAS device using the current of training options in response to completion of the training;
determining a success or a failure of the exchange of information using the current set of training options;
repeating, for each of multiple sets of training options, the steps of: selecting a next set of training options, performing training, exchanging information, and determining a success or a failure for each of the multiple sets of training options; and
selecting a preferred set of training options for use of the link between the first SAS device and the second SAS device based on the determined success or failure of the exchange of information.

2. The method of claim 1
wherein the step of exchanging information further comprises:
performing a SCSI request exchange between the first SAS device and the second SAS device using the current set of training options.

3. The method of claim 2
wherein at least one of the first SAS device and the second SAS device stores data and wherein the SCSI request is non-destructive of the stored data.

4. The method of claim 3
wherein the non-destructive SCSI request may include one or more of: Test Unit Ready, Read Buffer, and Inquiry.

5. The method of claim 1
wherein the step of determining further comprises:
sensing errors in the PHY layer processing of the exchanged SCSI request to determine the success or the failure of the first mutually supported SAS speed using the current set of training options.

6. The method of claim 5
wherein the step of determining further comprises:
sensing one or more PHY layer errors wherein each PHY layer error may include: an 8b10b encoding error, and/or a symbol error, and/or a parity error, and/or a DWORD synchronization loss error.

7. The method of claim 1
wherein the step of selecting the next set of training options further comprises:
selecting each set of training options wherein the set of options includes one or more of: amplitude, slew rate, de-emphasis, and spread spectrum clocking.

8. The method of claim 1
wherein the set of training options includes training timing values outside a corresponding range of supported timing values, the training timing values including one or more of: rate change delay time ("RCDT"), train-snw time ("TWT"), training lock time ("TLT"), maximum training time ("MTT"), and actual training time ("ATT").

9. A SAS device comprising:
a PHY layer for physical link media control of each PHY of the SAS device;
a transceiver training element adapted to perform transceiver training of the SAS device for communication between the SAS device and another SAS device coupled to a corresponding PHY of the SAS device, wherein the transceiver training element is adapted to perform transceiver training during a training window; and
a training options testing element responsive to the training element and adapted to configure the SAS device for a first mutually supported speed with the other SAS device, further adapted to, for each of multiple sets of training options, select a next set of training options as a current set of training options for the SAS device, further adapted to exchange information with the other SAS device using the current set of training options, and further adapted to determine a success or a failure of the information exchanged using the current set of training options, wherein the training option testing element is further adapted to select a preferred set of training options for use of the link with the other SAS device based on the determined success or failure of the exchange of information for each of the multiple sets of training options.

10. The device of claim 9
wherein the training options testing element further comprises:
a memory for storing information regarding each set of training options tested for the other SAS device.

11. The device of claim 10
wherein the memory includes:
training options memory for storing each set of training options tested for the other SAS device and the results of the determined success or failure for each set of training options.

12. The device of claim 11
wherein each PHY layer includes:
a counter for each type of PHY layer error that may be sensed in the exchange between the SAS device and the other SAS device,
and wherein the memory includes:
PHY error memory for storing PHY error counter values for each set of training options tested for the other SAS device.

13. A method for speed negotiation between a master SAS device coupled to another SAS device through a corresponding PHY layer of the master SAS device, the method comprising:
configuring the master SAS device and the other SAS device for a first mutually supported speed;
selecting a next set of training options as a current set of training options for training between the master SAS device and said another SAS device;
participating in a SAS training window to send one or more SCSI commands from the master SAS device to the other SAS device and to receive a SCSI response from the other SAS device to test the current set of training options;
storing indicia of a success or a failure of the SCSI commands and the SCSI responses exchanged using the current set of training options;
repeating the steps of selecting training options, participating, and storing, for each possible set of training options of the master SAS device associated with the first mutually supported speed of the master SAS device; and
selecting a preferred set of training options for use of the link between the master SAS device and the other SAS device based on the indicia of the success or the failure of the SCSI commands and the SCSI responses exchanged for each of multiple sets of training options.

14. The method of claim 13
wherein sending one or more SCSI commands comprises sending one or more non-destructive SCSI commands.

15. The method of claim 13
wherein the step of selecting the next set of training options comprises one or more of the steps of:
configuring an amplitude option setting;
configuring a slew rate option setting;
configuring a de-emphasis option setting; and
configuring a spread spectrum clocking option.

16. The method of claim 13
wherein the step of repeating further comprises:
performing a PHY reset sequence prior to configuring a next possible set of training options in advance of a next training window between the master SAS device and the other SAS device.

17. The method of claim 13
wherein the step of configuring the next set of training options comprises configuring one or more timing options for the transceiver.

18. The method of claim 17
wherein the step of configuring one or more timing options comprises one or more of the steps of:
configuring a transceiver rate change delay time;
configuring a transceiver train-snw time;
configuring a transceiver training lock time;
configuring a transceiver maximum training time; and
configuring a transceiver actual training time.

* * * * *